Figure 1:
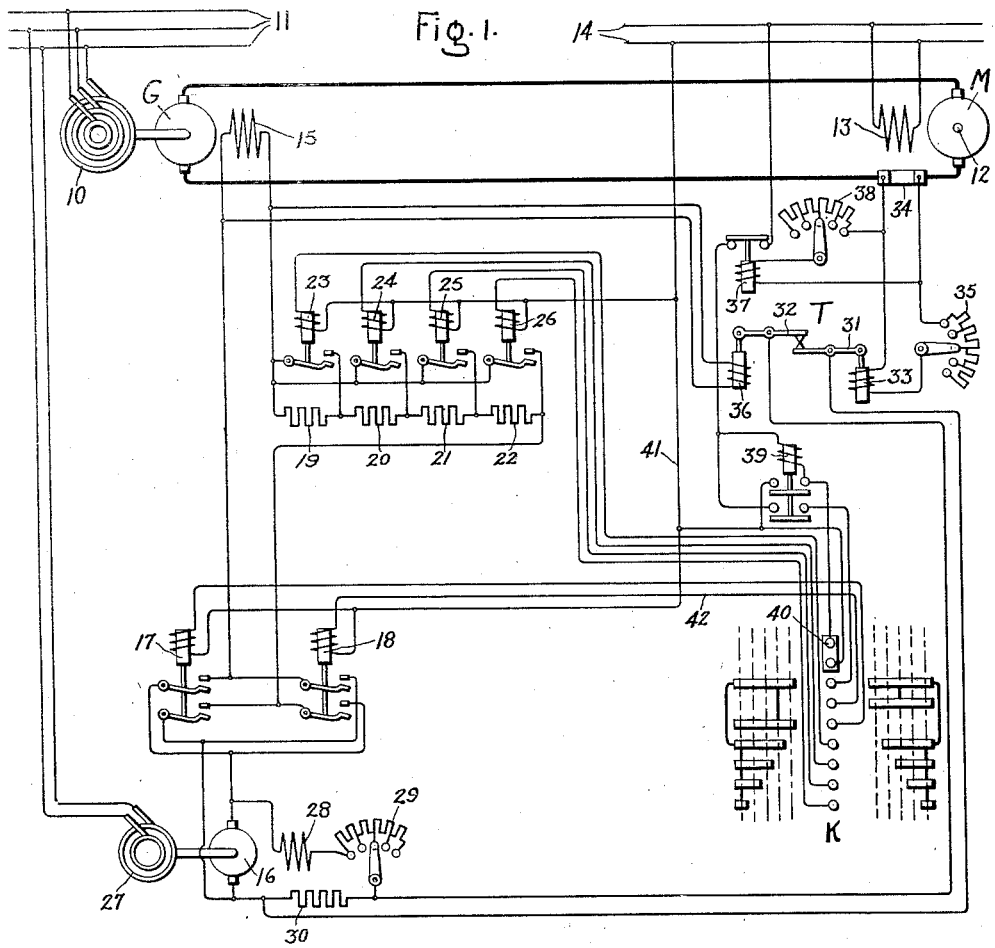

Oct. 22, 1929.  E. RIECKE  1,733,074

ELECTRIC DRIVE

Filed Sept. 1, 1925

Inventor:
Ernst Riecke,
by Alexander S. ——
His Attorney.

Patented Oct. 22, 1929

1,733,074

UNITED STATES PATENT OFFICE

ERNST RIECKE, OF CHARLOTTENBURG, GERMANY, ASSIGNOR TO GENERAL ELECTRIC COMPANY, A CORPORATION OF NEW YORK

ELECTRIC DRIVE

Application filed September 1, 1925, Serial No. 53,914, and in Germany November 26, 1924.

My invention relates to electric drives; particularly electric drives of the Ward-Leonard type, in which the driving motor is operated at varying speed and with varying torque by controlling the voltage of the generator from which the motor is supplied with current. The invention provides an improved drive of the above character in which the generator field excitation is automatically controlled so as to limit the motor speed and torque.

More specifically, the present invention enables a variable load presenting a widely varying torque such, for example, as a rolling mill, a forging press or the like, to be driven by a Ward-Leonard connected motor and generator arranged so that the generator field excitation is automatically reduced when the load imposed upon the driving motor becomes excessive. In accordance with the preferred form of my invention the value of load current required to effect reduction in the generator field excitation is made dependent upon the particular voltage at which the driving current is being supplied to the motor. In this way it is possible to insure against stalling the motor at the higher operating speeds with resulting excessive stresses in the driving parts of the motor or the driven machine due to the stored kinetic energy, and at the same time obtain full current torque at lower speeds. Moreover, the control arrangement is such that the generator field excitation first is reduced a predetermined amount when the load on the driving motor exceeds a predetermined value dependent upon the particular generator voltage and consequently the speed at which the motor is operating and then is interrupted entirely in case the motor load increases beyond a predetermined maximum value. Furthermore, means are provided for automatically preventing reenergization of the generator field until the motor is restarted at slow speed.

Thus, where a rolling mill or forging press is driven by a Ward-Leonard connected motor and generator arranged in accordance with my invention, excessive overloads on the driven machines, as well as the electric driving machines, are effectively and automatically prevented.

In carrying the invention into effect in a preferred form, the generator field excitation is arranged to be varied at will by a suitable controller in order to operate the driving motor at the required speed and with the desired torque. In order to automatically stop the driving motor when the load thereon becomes excessive, I provide electroresponsive switch mechanism energized in accordance with the driving current supplied to the motor for automatically interrupting the generator field excitation when the motor driving current exceeds a predetermined maximum value which may be adjusted. At the higher operating speeds the kinetic energy stored in the rotating parts of the motor and the machines driven thereby, however, may set up very great strains or stresses in case the forging resistance rapidly increases. Hence, in order to avoid such mechanical stresses, I provide an automatic regulating device which is arranged to automatically reduce the generator field excitation a predetermined amount when the motor driving current exceeds some value below the previous mentioned maximum value. Thus, the motor speed may be automatically reduced and the kinetic energy of the rotating parts correspondingly lowered as soon as the load starts to become excessive at any of the higher operating speeds of the motor. In accordance with the preferred form of the invention the value of motor driving current required to operate the automatic regulating device is made to depend upon the value of the generator voltage and, consequently, upon the operating speed of the motor. This may be accomplished by providing the regulating device with two cooperating windings, one of which is operated in accordance with the generator field excitation and the other of which is responsive to the motor driving current. In this way the automatic regulating device is arranged by suitable means to reduce the generator field excitation when the motor driving current exceeds a certain value with a low generator voltage and corresponding motor speed while the reduction of the generator field excitation occurs at progressively lower values of driving current as the generator voltage and motor speed are increased.

Figure 2:
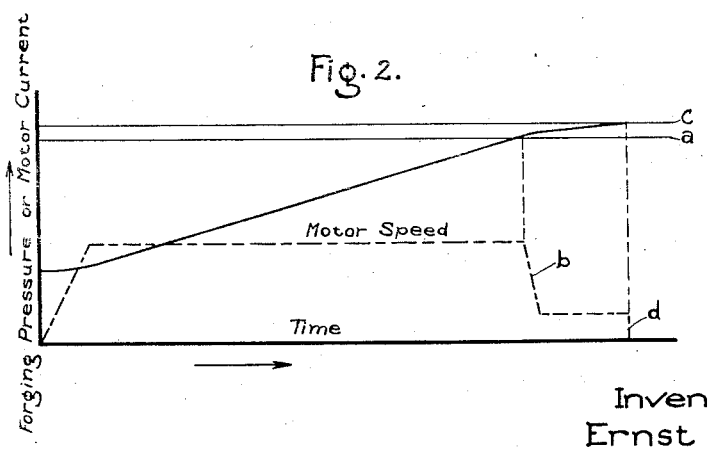

A more complete understanding of the invention may be had from a consideration of the accompanying drawing, in which Fig. 1 is a circuit diagram showing a Ward-Leonard forging press drive equipment embodying the invention in a preferred form and Fig. 2 is a chart showing the relation between the motor speed and the motor torque, which corresponds to the forging pressure during an assumed forging operation.

Referring to Fig. 1 of the drawing, the driving motor M as shown is of the separately excited direct current type and the generator G, which is connected to supply driving current to the motor M, likewise is separately excited. The generator G is mechanically driven by suitable means, such as the alternating current motor 10, which receives power from the supply lines 11. It will be understood that the shaft 12 of motor M is mechanically connected through suitable means, preferably a hydraulic operating mechanism, to drive the forging press, although for the sake of clarity, the mechanical driving connection of Motor M has been omitted from the drawing. The separately excited field winding 13 of motor M is energized from suitable supply lines 14, while the separately excited field winding 15 of generator G receives exciting current from the exciter 16 through the electroresponsive field reversing switches 17 and 18, which are operated under the control of manually operated controller K to run the motor M in either direction. The several resistors 19, 20, 21 and 22, are connected in the energizing circuit of the generator field winding, and are arranged to be short circuited by the corresponding electroresponsive switches 23, 24, 25, 26, which also are operated under the control of the controller K.

The exciter 16 for the generator field winding is arranged to be driven at substantially constant speed by the alternating current motor 27 and is provided with a shunt field winding 28. The adjustable rheostat 29 and the resistor 30 are connected in circuit with the exciter field winding 28, and arranged so that the exciter voltage, and consequently the excitation of the generator field winding 15, may be varied.

In order to vary the excitation of the generator field winding, in accordance with my invention, the automatic regulator T is provided for controlling a short circuit around the exciter field regulating resistor 30. It will be observed that the automatic regulator T is of the Tirrill type, having two cooperating movable circuit controlling members 31 and 32 which control the short circuit around the resistor 30. The regulator contact 31 is operated by the electromagnet 33, which is connected to the shunt 34 to be energized in accordance with the driving current supplied to the motor M and the adjustable rheostat 35 is provided for regulating the value of the energizing current supplied to the operating winding of the magnet 33. The regulator contact 32 is under the control of an electromagnet 36 which as shown is energized in accordance with the voltage impressed upon the generator field winding 15. As will be more fully pointed out in connection with the operation of my invention, the automatic regulator T is arranged to open the short circuit around the resistor 30, and thereby reduce the field excitation of generator G when the driving current supplied to the motor M exceeds a certain value, dependent upon the excitation, and consequently the voltage, of generator G. In this way when the motor load, and consequently the motor driving current, become excessive, the generator voltage is automatically reduced to correspondingly reduce the motor speed and torque.

In order to stop the motor entirely in case the motor driving current reaches such a value that the mechanical stresses set up in the forging press, the motor, or the driving connections therebetween, become dangerously high, the automatic electroresponsive switch 37 is arranged to interrupt the excitation of the generator G when the motor driving current exceeds a certain maximum value. The operating winding of the electroresponsive switch 37 as shown is connected across the shunt 34 to be energized in accordance with the motor driving current and the adjustable rheostat 38 is provided for adjusting the current value at which the electroresponsive switch 37 operates. The switch 37 interrupts the circuit through which each of the electroresponsive field reversing switches 17 and 18, as well as electroresponsive switches 23, 24, 25, 26, are energized from the supply line 14 under the control of the controller K, as will be more fully pointed out hereinafter.

When the switch 37 operates to deenergize the generator field winding 15 by opening the field reversing switch 17 or 18, the driving current supplied to the motor M at once decreases to a negligible value. To insure against reenergization of the generator field winding 15, due to the resulting reclosure of the switch 37, the interlocking relay 39 is provided and arranged so that the controller K must be returned to the off position before the energizing circuit for the field reversing switches 16 and 17 may be reestablished.

The operation of the motor generator control system illustrated is as follows: with the supply lines 11 energized from a suitable alternating current source, the alternating current, motors 10 and 27 may be set into operation by means of suitable control apparatus not illustrated in the drawing, thus driving the generator G and the exciter 16 at substantially constant speed. With the supply line 14 energized from a suitable direct current source, the field winding 13 of the motor M is energized. Likewise, with the controller K in the off position in which it is shown, the operating winding of relay 39 is energized through a circuit which may be traced from the upper supply line 14 through the contacts of switch 37, the operating winding of relay 39, the contact 40 of controller K, and the conductor 41, to the lower supply line 14. Upon the resulting closure of relay 39, the upper contact of the relay establishes a holding circuit in shunt with the contact 40 of the controller K, thereby maintaining the relay 39 energized when the controller K is operated from the off position.

Under these conditions the generator field winding 15 may be energized to cause the generator G to supply driving current to the motor M by operating the controller K from the off position in which it is shown, either to the right or the left, depending upon the direction in which it is desired to operate the motor M.

If the controller K is operated to bring the right hand contact segments into engagement with the stationary contacts of the controller, an energizing circuit for the field reversing switch 18 is established in the first operative position of the controller which may be traced from the lower supply line 14 through the conductor 41, the operating winding of switch 18, the conductor 42, the upper right hand segments of controller K, the lower contact of relay 39, and thence through the contacts of electroresponsive switch 37 to the upper supply line 14.

Switch 18 at once is operated to the closed position to connect the exciter 16 and the field winding 15 of the generator G with the regulating resistors 19, 20, 21, 22 in circuit therewith. Since the resistor 30 is short circuited by the automatic regulator T, the voltage of the exciter 16 is determined by the setting of the adjustable rheostat 29 and the energizing current supplied to the generator field winding 15 is limited to a relatively low value by the several resistors 19, 20, 21, 22. The resulting excitation of generator G causes the motor M to be supplied with driving current and the motor at once starts to drive the forging press load connected thereto.

Further operation of controller K to engage the contact segments thereof with the controller stationary contacts serves to progressively energize the electroresponsive switches 23, 24, 25, 26, which operate to short circuit the corresponding resistors 19, 20, 21, 22. In this way the excitation of generator G is increased to the maximum value to operate the motor M at the desired speed required for operating the forging press.

Referring to Fig. 2, the dash-dotted line indicates the speed of driving motor M during this phase of the forging operation and the full line indicates the resulting forging pressure and, consequently, the value of the driving current supplied to the motor M from the generator G. The operating winding 33 of the automatic regulator T may be adjusted by means of the rheostat 35 so that when the forging operation has progressed to the point where with full generator voltage and the motor operating at full speed the forging pressure, and consequently the driving current of motor M, reaches the value indicated as the line $a$, the regulator contacts 31 and 32 are separated, thereby inserting the resistor 30 in circuit with the field winding 28 of the exciter 16. Ordinarily the resulting decrease in the exciter voltage serves to decrease the excitation of generator G by such an amount that the driving current supplied to the motor M is maintained within safe operating limits. This results in a decrease in the motor speed as indicated at $b$ in Fig. 2.

In case, however, the load imposed upon the motor M continues to rapidly increase so that at the lower speed, the motor driving current reaches a still higher value, such, for example, as indicated by the line $c$, Fig. 2, the electroresponsive switch 37 is calibrated by means of the adjustable rheostat 38 to open its contacts and thereby interrupt the energizing circuit for the electroresponsive switches 18, 23, 24, 25, 26. At the same time relay 39 is denergized and opens its contacts.

Upon the opening of switch 18 the exciting current for the field winding 15 of generator G is opened and, consequently, the generator excitation is interrupted and no driving current is supplied to the motor M. The motor M immediately stops as indicated at $d$ in Fig. 2, since the kinetic energy stored in the rotating parts of motor M at the reduced operating speed is of relatively low value. Due to the action of the operating electromagnet 36 of the regulator T, the value of the motor driving current at which the regulator contacts are separated is dependent upon the voltage of the generator G. The arrangement is such that with the maximum generator voltage, and consequently the maximum motor speed, a lower value of driving current is required to separate the contacts of the automatic regulator than with a lower value of generator voltage and lower motor speed. It may be noted, however, that with the generator voltage at relatively low values as, for example, during starting and acceleration of the motor, the regulator T permits a relatively large value of driving current to be supplied to the motor M without responding to insert the resistance 30 in the generator field circuit.

This is due to the compensating action of the generator voltage responsive winding 36 of the regulator.

It will be evident that when the motor driving current is reduced to zero the contacts of the electroresponsive switch 37 and also of the automatic regulator T are reclosed. However, due to the fact that the relay 39 is opened, the electroresponsive field reversing switches 17 and 18, as well as the field controlling switches, 23, 24, 25, 26, are not energized until the controller K is returned to the off position to reenergize relay 39 through the controller contact 40.

The operation of the motor M in the reverse direction is accomplished in exactly the same manner except that the controller K is operated to engage the left hand contact segments with the stationary controller contacts and the field reversing switch 17 is energized instead of the switch 18.

While I have illustrated and described a specific embodiment of my invention for the purpose of explaining the principles thereof, I would have it understood that the apparatus shown is only illustrative and that the invention may be carried out by other means.

What I claim as new and desire to secure by Letters Patent of the United States is:

1. In a Ward-Leonard drive, the combination with the direct current driving motor and the variable voltage generator permanently connected for supplying driving current to the motor, of means for controlling the generator field excitation to vary the voltage at which the driving current is supplied to the motor, automatic means responsive to the motor driving current for interrupting the generator field excitation to stop the motor when the driving current exceeds a predetermined value, and means under the control of said first means for maintaining the generator field excitation interrupted to stop the motor upon operation of said automatic means.

2. In a Ward-Leonard drive, the combination of a direct current driving motor, a variable voltage generator permanently connected for supplying driving current to the motor and having a separately excited field winding, switch mechanism for controlling the generator field excitation to thereby vary the generator voltage, electroresponsive switch mechanism in the generator field circuit energized in accordance with the motor driving current and arranged to automatically interrupt the generator field circuit when the motor driving current exceeds a predetermined value, and means dependent upon operation of said electroresponsive switch mechanism for maintaining the generator field circuit interrupted to stop the motor.

3. In a Ward-Leonard drive, the combination of a direct current driving motor, a variable voltage generator permanently connected for supplying current thereto, means for varying the generator field excitation to vary the voltage at which the driving current is supplied to the motor, means responsive to the motor driving current for automatically opening the generator field circuit to stop the motor when the driving current exceeds a predetermined value, and means associated with said first means for preventing reexciting the generator field until after the said first means is operated to reduce the generator field excitation to the minimum value.

4. In a Ward-Leonard drive, the combination with the separately excited variable speed direct current driving motor and the separately excited variable voltage generator permanently connected for supplying driving current thereto, of a plurality of electrically operated switches for varying the excitation of the generator to correspondingly vary the voltage thereof, a master controller operable from an off position to a plurality of operating positions for successively operating said switches, electroresponsive means connected to be energized in accordance with the driving current supplied from the generator to the motor and arranged to open the generator field circuit when the motor driving current exceeds a predetermined value, and means cooperating with said electroresponsive means for insuring the return of the said controller to the off position before the generator field winding is reexcited.

5. In a Ward-Leonard drive, the combination with the direct current driving motor and the variable voltage generator permanetly connected for supplying driving current thereto, of means responsive to the driving current supplied to the motor for automatically reducing the generator voltage a predetermined amount when the motor driving current exceeds a predetermined value, and means responsive to a higher predetermined value of the motor driving current for automatically rendering the generator ineffective to thereby insure immediate stopping of the motor.

6. In a Ward-Leonard drive, the combination with the separately excited direct current driving motor and the separately excited variable voltage generator permanently connected for supplying driving current thereto, of electroresponsive switch mechanism energized in accordance with the driving current supplied to the motor for automatically reducing the generator excitation a predetermined amount when the motor driving current reaches a predetermined value, independently operable electroresponsive switch mechanism connected to be energized in accordance with the driving current of the motor and arranged to interrupt the separate exciting circuit of the generator when the motor driving current exceeds a predetermined value, and electroresponsive means under the control of said independently operable electroresponsive switch mechanism for maintaining the excitation circuit of the generator interrupted to stop the motor upon operation of said switch mechanism.

7. In a Ward-Leonard drive, the combination with the direct current driving motor and the variable voltage generator permanently connected for supplying driving current thereto, of a separately excited field winding for the generator, switch mechanism for controlling the energization of said field winding to correspondingly vary the generator voltage between a plurality of predetermined values, electroresponsive switch mechanism energized in accordance with the driving current of the motor, and arranged to reduce the exciting current of said separately excited field winding a predetermined amount when the motor driving current reaches a predetermined value, independently operable electroresponsive switch mechanism energized in accordance with the motor driving current for automatically deenergizing the said separately excited generator field winding when the motor driving current exceeds a predetermined maximum value, and electroresponsive means under the control of said independently operable electroresponsive switch mechanism for maintaining the excitation circuit of the generator interrupted to stop the motor after operation of said switch mechanism.

8. In a Ward-Leonard drive, the combination of the separately excited direct current driving motor, the generator permanently connected for supplying driving current thereto and having a separately excited field winding, of a current regulating resistor in circuit with the separately excited generator field winding, an electroresponsive switch for connecting the generator field winding with said resistor in circuit therewith to a source of supply, independently operable electroresponsive switches for controlling said resistor to vary the generator field winding exciting current and thereby vary the generator voltage, a controller for said electroresponsive switches having an off position and operable to a plurality of operative positions to effect successive operation of said electroresponsive switches to vary the generator voltage between a plurality of values, electroresponsive means energized in accordance with the driving current of the motor and arranged to reduce the exciting current of the generator separately excited field winding a predetermined amount when the motor driving current reaches a predetermined value, and electroresponsive means energized in accordance with the motor driving current and cooperating with said controller to operate said electroresponsive switches to deenergize the separately excited field winding of the generator when the motor driving current exceeds a predetermined value and to maintain the generator field winding deenergized until the said controller is operated to a predetermined position.

9. In a Ward-Leonard drive, the combination with the direct current driving motor and the variable voltage generator for supplying driving current thereto, of switch mechanism for controlling the generator field excitation to thereby vary the value of the voltage of the generator, and electroresponsive means connected to be jointly responsive to variations in the value of the generator voltage and the motor driving current, and arranged to automatically reduce the generator voltage when the motor driving current exceeds different predetermined values dependent upon the value of the generator voltage.

10. In a Ward-Leonard drive, the combination of the direct current driving motor and the variable voltage generator for supplying driving current thereto, of switch mechanism for controlling the generator field excitation to vary the voltage thereof, an independently operable electroresponsive device for controlling the generator field excitation, said device having one operating winding connected to be energized in accordance with the driving current supplied to the motor and a second operating winding energized in accordance with the generator voltage and arranged to automatically reduce the generator field excitation when the motor driving current exceeds different values inversely dependent upon the value of the generator voltage.

11. In a Ward-Leonard drive the combination of the direct current driving motor and the generator for supplying driving current thereto, of means for controlling the generator field excitation to vary the voltage at which the driving current is supplied to the motor, means operable in response to the motor driving current for automatically reducing the generator voltage a predetermined amount, and means cooperating with said first means for automatically varying the value of motor driving current required to operate the same inversely in accordance with the values of the generator voltage.

12. In a Ward-Leonard drive, the combination with the direct current driving motor and the variable voltage generator for supplying driving current to the motor, switch mechanism for controlling the generator field excitation to thereby vary the generator voltage, electroresponsive means connected to be energized in accordance with the driving current supplied to the motor and arranged to automatically reduce the generator voltage responsively to different values of the motor driving current, and electroresponsive means for predetermining the value of motor driving current required to operate said first electroresponsive means inversely in accordance with the generator voltage.

13. In a Ward-Leonard drive, the combination with the separately excited direct current driving motor and the separately excited variable voltage generator for supplying driving current thereto, of means for varying the generator field excitation to thereby vary the generator voltage, independent means for controlling the generator field excitation comprising an electroresponsive circuit controlling device having one operating winding connected to be energized in accordance with the value of the generator field excitation and a second winding connected to be energized in accordance with the driving current supplied to the motor, and means jointly controlled by said windings for reducing the generator field excitation when the driving current supplied to the motor reaches one value with the generator voltage at a certain value and for reducing the generator field excitation when the driving current supplied to the motor reaches a lower value with the generator voltage at a higher value.

14. In a Ward-Leonard drive, the combination with the separately excited direct current driving motor and the separately excited variable voltage generator for supplying driving current thereto, of electroresponsive switch mechanism energized in accordance with the driving current supplied to the motor for automatically reducing the generator excitation, electroresponsive means for cooperating with said electroresponsive switch mechanism to vary the value of the motor driving current required for operation thereof inversely in accordance with the value of the voltage of the generator, independently operable electroresponsive switch mechanism energized in accordance with the driving current of the motor and arranged to interrupt the excitation of the generator when the motor driving current exceeds a predetermined maximum value and electroresponsive means under the control of said independently operable electroresponsive switch mechanism for maintaining the excitation of the generator interrupted after operation of said independently operable switch mechanism.

In witness whereof, I have hereunto set my hand this 12th day of August, 1925.

ERNST RIECKE.